United States Patent [19]

Araki et al.

[11] Patent Number: 5,064,029

[45] Date of Patent: Nov. 12, 1991

[54] EDDY CURRENT RETARDER

[75] Inventors: Kenji Araki; Jyunichi Miyamae, both of Nara; Takashi Kobayashi; Akira Saito, both of Osaka, all of Japan

[73] Assignees: Sumitomo Metal Industries, Ltd.; Sumitomo Special Metals Co., Ltd., both of Osaka, Japan

[21] Appl. No.: 400,101

[22] Filed: Aug. 29, 1989

[30] Foreign Application Priority Data

| Oct. 31, 1988 | [JP] | Japan | 63-142508[U] |
| Feb. 1, 1989 | [JP] | Japan | 1-11596[U] |
| Feb. 7, 1989 | [JP] | Japan | 1-13222[U] |

[51] Int. Cl.$^5$ .............................................. B60L 7/28
[52] U.S. Cl. ................................. 188/267; 188/264 R;
192/84 PM; 192/113 A; 310/105
[58] Field of Search .................... 188/267, 264 R, 164;
192/84 PM, 84 E, 113 A; 310/105

[56] References Cited

U.S. PATENT DOCUMENTS

| 1,924,060 | 8/1933 | Huck | 188/264 R |
| 2,771,171 | 11/1956 | Schultz | 192/84 M |
| 3,056,895 | 10/1962 | Cohen et al. | 310/105 X |
| 3,256,823 | 6/1966 | Keyes | 310/105 X |
| 3,413,500 | 11/1968 | Gomez . | |
| 4,685,202 | 8/1987 | Booth et al. | 192/84 PM |

FOREIGN PATENT DOCUMENTS

| 2103660 | 8/1972 | Fed. Rep. of Germany | 188/267 |
| 61574 | 10/1973 | Japan . | |
| 93258 | 8/1978 | Japan | 188/267 |
| 234043 | 9/1989 | Japan | 310/105 |

Primary Examiner—George E. A. Halvosa
Attorney, Agent, or Firm—Burns, Doane, Swecker & Mathis

[57] ABSTRACT

An eddy current retarder includes a rotor (3) fitted over a rotating shaft (1) at one end thereof and a support ring (7) around which a plurality of permanent magnets (10) are circumferentially provided in such a manner that the polarities of any adjacent magnets become opposite to each other. The support ring (7) is provided such that it is allowed to move back and forth in the axial direction of the rotating shaft (1) from a first position where the pole surfaces of the permanent magnets (10) fully confront the rotor (3) with a predetermined gap being secured therebetween to a second position where the former fully deviate from the latter. A boss portion (22) of the rotor (3) adapted to confront the permanent magnets (10) circumferentially provided around the support ring (7) and a cylindrical portion of the same are connected to each other by a support member (31), and this support member (31) comprises a fan (30) having axial blades (35) and radial blades (36) formed, respectively, radially inwardly and radially outwardly of the support member (31). Stator blades (37) are circumferentially provided close to the axial blades (35) on a bearing housing tube (4) fitted over the rotating shaft (1), and cooling fins (28) are radially provided on the external circumferential surface of the bearing housing tube (4) in such a manner as to protrude therefrom.

4 Claims, 13 Drawing Sheets

EDDY CURRENT RETARDER

FIELD OF THE INVENTION

The present invention relates to an improved eddy current retarder for use in vehicles of large tonnage such as buses, trucks and so forth.

STATEMENT OF THE PRIOR ART

There are three types of retarders or brakes currently used in vehicles of a large tonnage. They are a foot brake functioning as a main brake, an exhaust brake functioning as an auxiliary brake and an eddy current retarder for stably retarding the speed of a vehicle during prolonged downhill running with the burning of the foot brake being thus prevented. To be specific, this burning of the foot brake is actually caused when the lining of the foot brake extraordinarily wears out or when a fade phenomenon occurs. The fade phenomenon is a phenomenon in which the braking force is reduced as the temperature of the brake increases.

This eddy current retarder comprises a number of electromagnets each comprising in turn an iron core and an electromagnetic coil wound around the iron core so as to function as magnetic poles and discs disposed on the sides of the magnetic poles, and when these electromagnets are energized via a battery of a vehicle, magnetic fields are generated so as to produce a torque by the action of an eddy current phenomenon in the direction in which the speed of the discs are reduced, thereby obtaining a braking force (refer to Japanese Patent Public Disclosure No. 61574/75).

Prior art eddy current retarders are heavy and bulky since electromagnets each comprising an iron core and an electromagnetic coil wound around the iron core are used as magnetic poles, and this has been the disadvantage of the eddy current retarders of conventional types when they are installed in vehicles which are limited in its total weight and space where such a retarder is installed. In addition, the prior art eddy current retarders need constant energizing while a braking operation is performed, and this requires an increase in the capacity as well as electricity generating function of the battery since there is a high power consumption from the battery. When the electromagnetic coils are energized for a long period of time, the generation of Joule heat is increased due to the resistance in the coils, and this in turn increases the temperature of the bearings disposed near the electromagnets. On top of this, since a large amount of electricity is caused to flow, there is a risk of electric discharge occurring in an electrical system due a deterioration in the insulation, and hence the eddy current retarders of this type cannot be used in vehicles such as tankers or the like carrying explosive substances.

In contrast, permanent magnets are also used in the eddy current retarders instead of the electromagnets. In this case, however, a high degree of accuracy is required in their assembly. Furthermore, reactive eddy current components which are irrelevant to the braking force are reduced, and it is difficult to obtain high braking efficiency. In addition, since the permanent magnets are subjected to the influence of the demagnetizing force produced by the action of eddy current generated in the discs used, they are liable to be demagnetized. It is a general view that permanent magnets of a conventional type (for instance, Alinico magnet) cannot bear the demagnetizing force.

Currently, magnets having superior magnetic properties have been developed, and they are rare earth-iron-boron magnets or the like. However, the magnets of this type have an inherent disadvantage in that they tend to be influenced by temperature, and their magnetic properties decrease as the temperature rises. Another disadvantage inherent in the rare earth-iron magnets is that they oxidize very easily and tend to deteriorate due to corrosions under harsh ambient conditions (for instance, in an atmosphere of high humidity).

In a case where the eddy current retarder is used in a vehicle as a retarder, i.e. as a holding brake, since it differs from other ordinary brakes, if something abnormal such as a trouble occurs, the brake must be released so as to enable the normal driving of the vehicle.

SUMMARY OF THE INVENTION

An object of the present invention is to provide an eddy current retarder requiring energization of only a short period of time.

Another object of the present invention is to provide an eddy current retarder in which permanent magnets such as rare earth magnets or the like having the superior magnetic properties are used instead of electromagnets.

A further object of the present invention is to provide an eddy current retarder constructed such that an intermediate tube formed of ferromagnetic and non-magnetic materials is interposed between the permanent magnets and heating units so as to prevent heat transfer between the relevant members, whereby a thermal insulation effect is able to be obtained with extremely high efficiency, thus preventing the deterioration of the magnetic properties of the permanent magnets with a magnetic path (a magnetic circuit) being formed for efficiently guiding magnetic fluxes entering the heating units and that the portion where the permanent magnets are present and the highly heated portion of support members for supporting the permanent magnets are forcibly cooled by utilizing the rotation of a rotor.

A still further object of the present invention is to provide an eddy current retarder constructed such that an intermediate tube formed of ferromagnetic and non-magnetic materials is provided so as to preserve the environmental conditions in which the permanent magnets are installed, thereby preventing the oxidization of the permanent magnets as well as preventing damage and deterioration of the surface coating for protecting the permanent magnets, the intermediate tube being formed in such a manner that even a minute gap is not permitted to exist between the ferromagntic and non-magnetic materials.

A further object of the present invention is to provide an eddy current retarder being provided therewith a safety device for automatically releasing the brake when an abnormality occurs in the brake.

A still further object of the present invention is to provide an eddy current retarder in which an eddy current path for increasing the eddy current components useful for generating a braking torque is formed on the internal peripheral surface of a rotor adapted to confront with the pole surfaces of the permanent magnets so as to obtain a high degree of braking efficiency.

In an eddy current retarder according to the present invention, a rotor is fitted over a rotating shaft at one end thereof, and a support ring around which a plurality of permanent magnets are provided in such a manner that the polarities of any adjacent magnets become opposite to each other is provided so as to be allowed to axially move back and forth along the length of the rotating shaft from a position where the surfaces of the poles of the permanent magnets fully confront the rotor to a position where the former fully deviates from the latter with a predetermined gap being maintained between the former and the latter irrespective of the support ring's positions.

Rare earth magnets having superior magnetic properties are preferably used for the above-mentioned permanent magnets, and included therein are rare earth cobalt magnets, rare earth-iron-boron magnets and so forth.

In the eddy current retarder constructed as described above, when the support ring around which the permanent magnets are provided is moved to a position where the permanent magnets are allowed to confront the rotor, an eddy current is caused to flow to the rotor via magnetic circuits each formed between any adjacent permanent magnets so as to generate a high braking torque.

In contrast, the braking torque to be generated becomes small as the supporting ring with the permanent magnets is gradually moved rearward from the above-mentioned full confrontation position, and the braking torque to be generated decreases. When the supporting ring with the permanent magnets fully retires and completely deviates from the rotor with no magnetic relationship being maintained at all therebetween, the braking condition is released.

In the eddy current retarder according to another embodiment of the present invention in which permanent magnets are used, a supporting member for connecting the boss portion of the rotor confronting the permanent magnets disposed on the peripheral surface of the supporting ring to the cylindrical portion of the same is constituted by a fan having axial blades and radial blades on its inner peripheral side and outer peripheral side, respectively, and stator blades peripherally disposed adjacent to the axial blades are mounted on a bearing housing tube fitted over the rotating shaft. Cooling fins are radially provided on the outer peripheral surface of the bearing housing tube in such a manner as to protrude therefrom.

This eddy current retarder is mounted on a vehicle's body in such a manner that the ends of the rotating shaft are connected to a propeller shaft at its intermediate point via cross joints.

When the rotating shaft of the retarder is caused to rotate by the rotational action of the propeller shaft, the rotor is also caused to rotate. Outside air taken in by means of the axial blades is caused to flow rearward through a space formed between the bearing housing tube and an inner tube of a magnetic shield casing via the stator blades so as to be discharged. During the rearward flow, the air is brought into contact with the bearing housing tube, the cooling fins, the inner tube of the magnetic shield casing and a supporting member therefor, and the heat carried by the air is dissipated. On the other hand, outside air passing through the radial blades is caused to flow rearward to be discharged. During the rearward flow the air is also brought into contact with the cooling fins formed on the outer peripheral surface of the cylindrical portion of the rotor, and the heat carried by the air is thereby dissipated.

A part of the air passing through the radial blades is allowed to enter the rotor via two layers of openings formed between the cylindrical portion and the cylinder to facilitate the cooling of the inner surface (the highest temperature portion) of the rotor. In addition, these two layers of openings are adapted to prevent direct heat transfer to the permanent magnets.

As described above, the permanent magnets are forcibly cooled from the front and rear sides thereof inside the retarder and are maintained in a condition in which their magnetic properties are best exhibited.

In the eddy current retarder according to a further embodiment of the present invention, permanent magnets are integrally fastened to a supporting ring formed of a ferromagnetic material via metal presser members formed of a non-magnetic material by fastening components formed of a non-magnetic material. Heat-resistant resilient members are interposed in contact portions between the respective metal presser members and permanent magnets for absorbing the difference in the thermal expansion, as well as protecting the surface coating over the permanent magnets.

This construction facilitates the easy and accurate assembly of the permanent magnets.

In the eddy current retarder according to a still further embodiment of the present invention, a plurality of air cylinders each having a coil spring mounted thereon for forcing an associated piston to withdraw by utilizing the spring force of the coil spring in the return stroke of the piston are circumferentially disposed around a frame for the retarder, and piston rods are joined to the above described supporting ring at their distal ends.

In this construction, when compressed air is supplied from an extruding port, the pistons are caused to move forward, overcoming the force of the coil spring and compressing the same, and the supporting ring around which the permanent magnets are circumferentially disposed is then caused to move. When the supporting ring is moved to a position allowing the permanent magnets to fully confront the rotor, an eddy current is caused to flow to the rotor via the respective magnetic circuits formed between any adjacent permanent magnets, thereby generating a high braking torque.

In the above state in which a high braking torque is generated, when venting the extruding compressed air, while supplying compressed air from a return port, the magnet support ring is caused to withdraw, and the braking torque to be generated becomes smaller as the permanent magnets currently fully confronting the rotor are caused to gradually deviate from the rotor. When the permanent magnets are caused to withdraw to a position where they fully deviate from the rotor, the braking condition is released.

Furthermore, in a case where the braking operation must be urgently released due to the occurrence of a problem during the braking operation, compressed air supplied from the extruding port is discharged. This allows the coil springs that are being compressed and urged to be extended so as to pressingly move the pistons, and the magnet support ring is then allowed to withdraw, the braking condition being thereby released.

In the eddy current retarder according to a further embodiment of the present invention, electrically conductive rings are provided at the ends of the internal circumferential surface of the cylindrical portion of the rotor, and a plurality of electrically conductive slots are circumferentially disposed in a direction parallel to the axis of the rotating shaft between these electrically conductive rings, and the ends of the respective slots are connected to the respective rings so as to form eddy current paths in the interior of the cylindrical portion.

The formation of the eddy current paths in the internal circumferential surface of the cylindrical portion of the rotor as described above facilitates, due to low electrical resistance, the flow of eddy current as well as the increase of eddy current components flowing in the axial direction that relates to the braking force. As a result of this, the braking force is greatly increased, thus making it possible to hold a vehicle over a wide range of speeds.

In the eddy current retarder according to a still further embodiment of the present invention, a cylinder is interposed between the internal circumferential surface of the cylindrical portion of the rotor and the external surface of the permanent magnets, and the cylinder is fixed to a fixed main body formed of a ferromagnetic material. This cylinder is formed of a non-magnetic material, and plates formed of a ferromagnetic material are interposed between the cylinder and the permanent magnets at positions where the former confronts the latter.

As described above, magnetic paths necessary for braking are effectively formed so as to improve the braking efficiency. Furthermore, this cylinder functions, as described previously, to prevent heat transfer from the heating unit (the rotor) to the permanent magnets, as well as functioning to protect the permanent magnets against the intrusion of foreign matters such as water, dusts, iron powders and so forth entering from the outside of the retarder, thus preserving the original environmental conditions of the permanent magnets.

BRIEF DESCRIPTION OF THE DRAWINGS

FIG. 12 is a diagram showing another embodiment of the eddy current retarder which is, in this case, an ultra-light retarder of a simple type having no power transmission shaft or the like;

DETAILED DESCRIPTION OF THE PREFERRED EMBODIMENTS

Referring to FIGS. 1 to 5, a first embodiment of the eddy current retarder according to the present invention will now be described.

Figure 1:
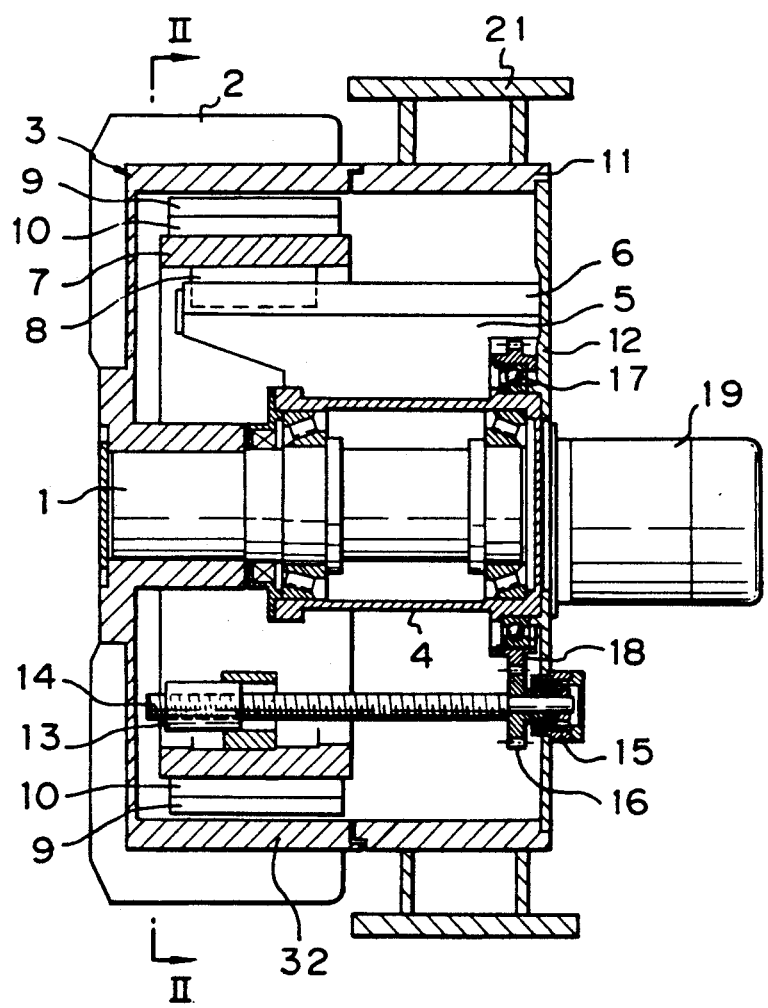
FIG. 1 is a vertical cross-sectional view of an eddy current retarder according to a first embodiment of the present invention which is in a braking operation.
Figure 2:
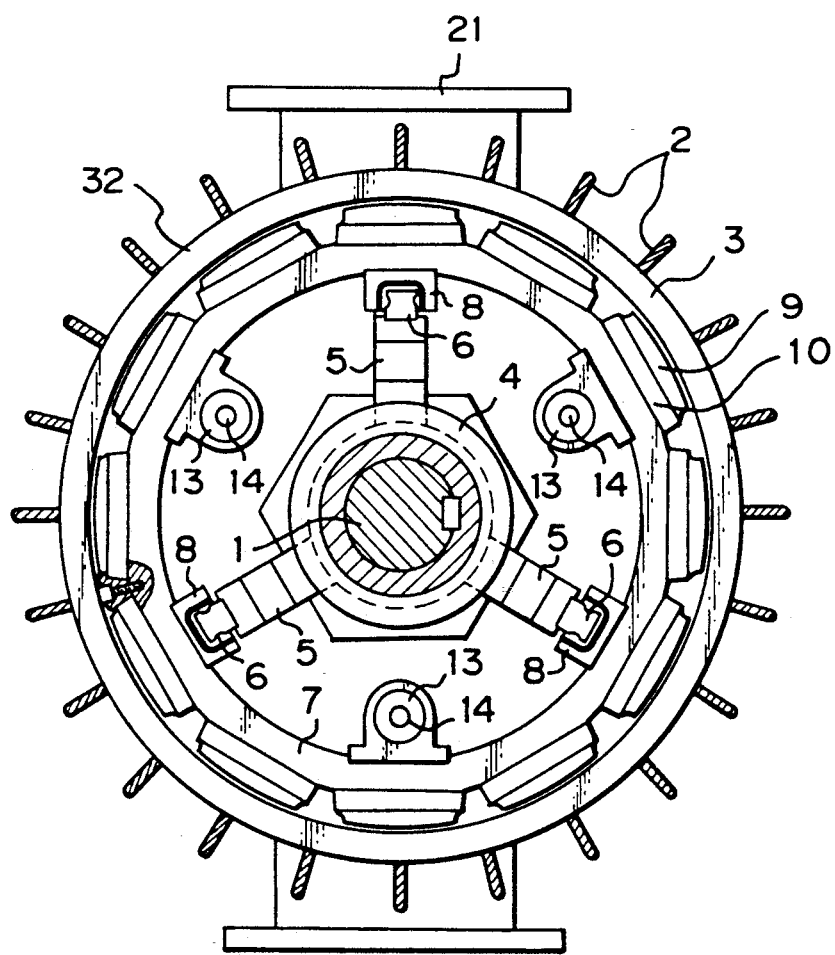
FIG. 2 is a cross-sectional end view of the same retarder viewed in the direction shown by reference arrows II of FIG. 1.

As shown in FIGS. 1 and 2, a rotor 3 of a U-shaped cross section having cooling fins 2 provided on its external circumferential surface is fitted over a rotating shaft 1 at one end thereof, and a plurality of axially elongating support members 5 (three support members being shown in the drawings) are radially disposed on a bearing housing tube 4 rotatably supporting the rotating shaft 1 in such a manner as to protrude therefrom, and guide rails 6 are mounted on the top surfaces of the respective support members 5. Sliding saddles 8 are provided on the internal circumferential surface of a support ring 7 or yoke the height of which corresponds to the length of the cylindrical portion of the rotor 3 in such a manner as to ride on the respective guide rails 6. This allows the respective support rings 7 to move over the their associated guide rails 6 back and forth relative to the rotor 3. A plurality of permanent magnets (twelve (even number) magnets are shown in the drawings) each comprising a rare earth magnet and having a pole piece 9 adhered thereto are provided on the external circumferential surface of the support ring 7 in such a manner that the magnetic poles of any adjacent magnets become opposite to each other.

A cylinder 11 having the same inside diameter as that of the cylindrical portion of the rotor 3 is separately provided on the extension of the rotor 3 in such a manner that it is held on a lid plate 12 mounted on the end face of the bearing housing tube 4, and these cylinder 11 and lid plate 12 form together a magnetic shield casing for preventing the leakage of magnetism from the retarder while it is not in a braking operation.

The permanent magnets 10 are allowed to smoothly reciprocate by forming both the rotor 3 and the cylinder 11 forming the casing from a material through which magnetic fluxes are allowed to easily pass (for instance, a lowcarbon steel or the like). The constitution of the casing is not limited to the one shown in this embodiment and may be optionally selected as long as it has a magnetic sealing function and allows the permanent magnets 10 to smoothly reciprocate. A nut 13 is provided on each of the three sliding saddles 8 provided on the internal circumferential surface of the support ring 7 at an intermediate point of the saddle 8 in such a manner as to protrude therefrom, and a screw shaft 14 adapted to be screwed in the nut 13 at one end thereof is rotatably supported at the other end on a bearing 15 mounted on the lid plate 12. A gear 16 is provided near the rotatably supported end of the screw shaft 14 for meshing engagement with an intermediate gear 18 having a large diameter rotatably supported on the bearing housing tube 4 via a bearing 17. This intermediate gear 18 is also adapted to mesh with a driving gear 20 (refer to FIG. 4) provided on a main shaft of a motor 19 mounted on the lid plate 12.

The retarder described above is mounted on a vehicle's body by means of a metal fixture 21 provided on the cylinder 11 with the ends of the rotating shaft 10 being connected to a propeller shaft at an intermediate position thereof via cross joints.

Figure 3:
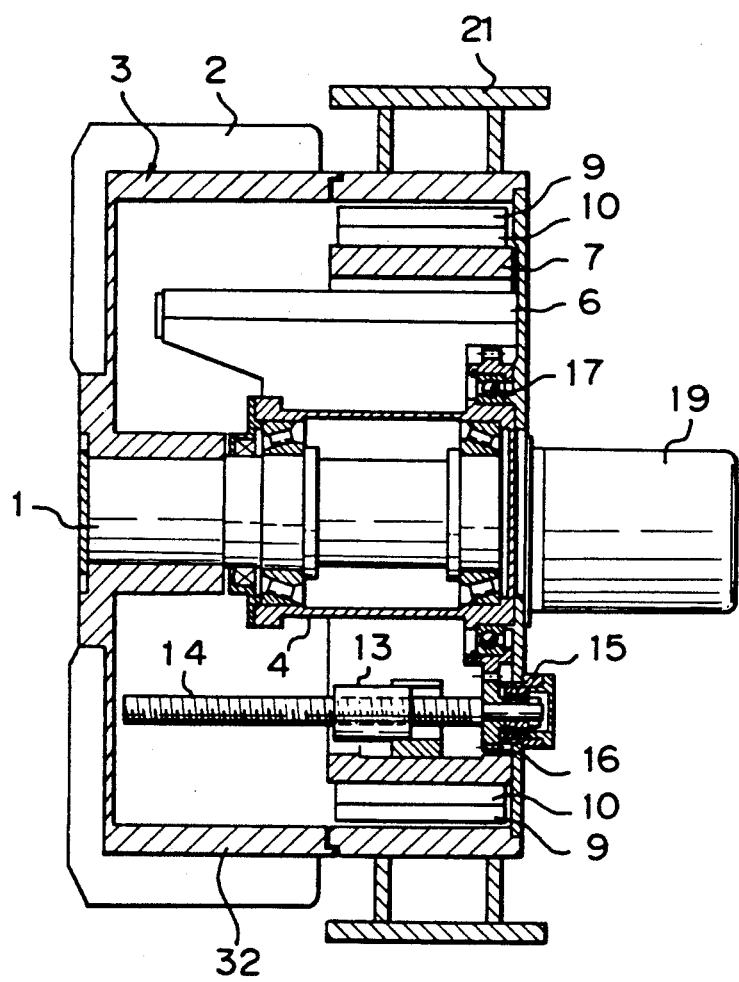
FIG. 3 is the same vertical cross-sectional view as that of FIG. 1 showing, in contrast, the eddy current gear which is in a non-braking position.
Figure 4:
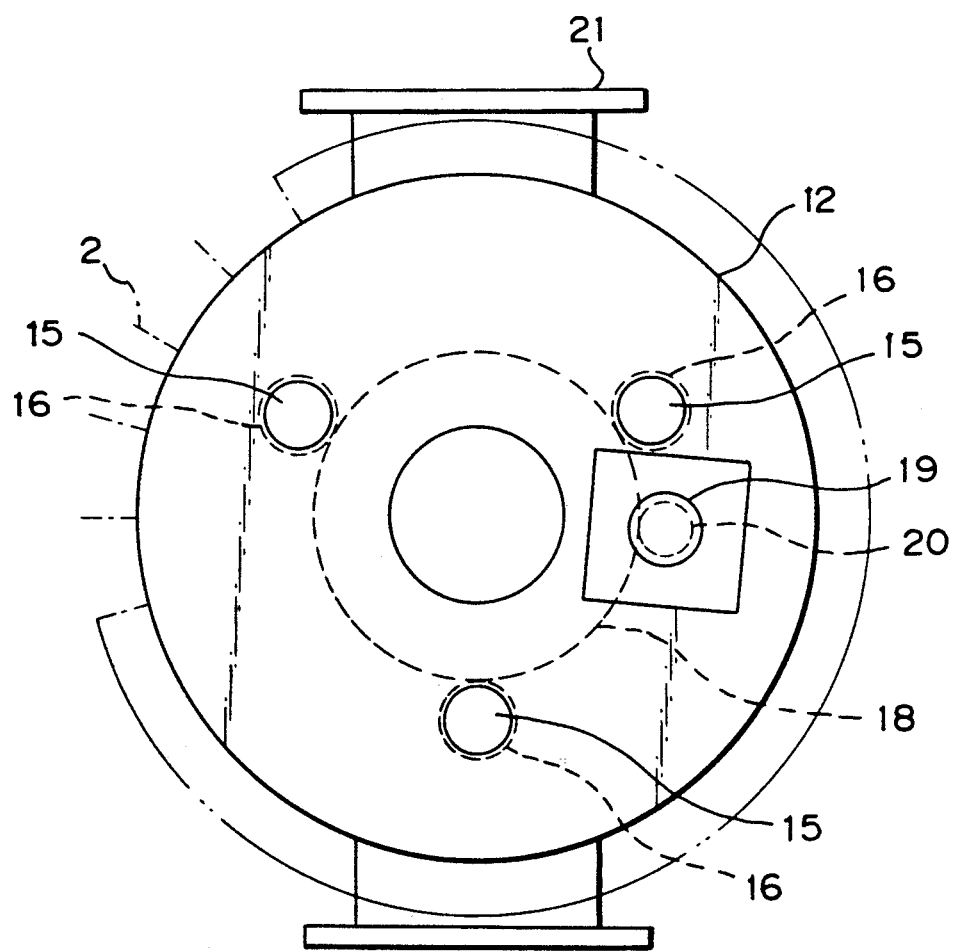
FIG. 4 is a right-hand side end view of the eddy retarder shown in FIG. 1 schematically showing the construction of a driving system for moving a support ring having permanent magnets back and forth.

As shown in FIG. 3, in this retarder, when the support ring 7 withdraws to a second position where a group of permanent magnets are allowed to fully deviate from the rotor, an eddy current does not flow into the rotor 3, allowing the rotor 3 to rotate at a predetermined torque. The retarder is in a so-called "BRAKE OFF" state.

In a case where the motor 19 is actuated in this "BRAKE OFF" state, the screw shaft 12 is caused to rotate via the driving gear 20, intermediate gear 18 and the gear 16. This allows the support ring to move forward toward the rotor 3 via the nut 13 until it reaches a first position where the whole area of the respective pole pieces fully confront the internal circumferential surface of the cylindrical portion of the rotor 3 with a predetermined gap being maintained therebetween. In this state, a maximum braking torque is obtained, and the vehicle speed is remarkably reduced.

In contrast, in a case where the motor is caused to rotate in a reverse direction in this state where a maximum braking torque is obtained so as to move the group of permanent magnets rearwardly, the braking torque is gradually reduced as the confronting area between the rotor and the permanent magnets becomes smaller, and this continues until the retarder is restored to the "BRAKE OFF" state shown in FIG. 3.

Therefore, when only a low braking force is needed, the position of the permanent magnets may be adjusted so that they are located at a position where the confronting area between the permanent magnets and the rotor becomes intermediate between the full confrontation position and that of full deviation. This kind of position control may be accomplished by installing position sensors of various types (not shown) for controlling the driving of the motor. In this embodiment, the pole piece is adhered over the surface of the magnetic pole of each permanent magnet, but the pole piece is not a member essential to the accomplishment of the present invention.

Figure 5:
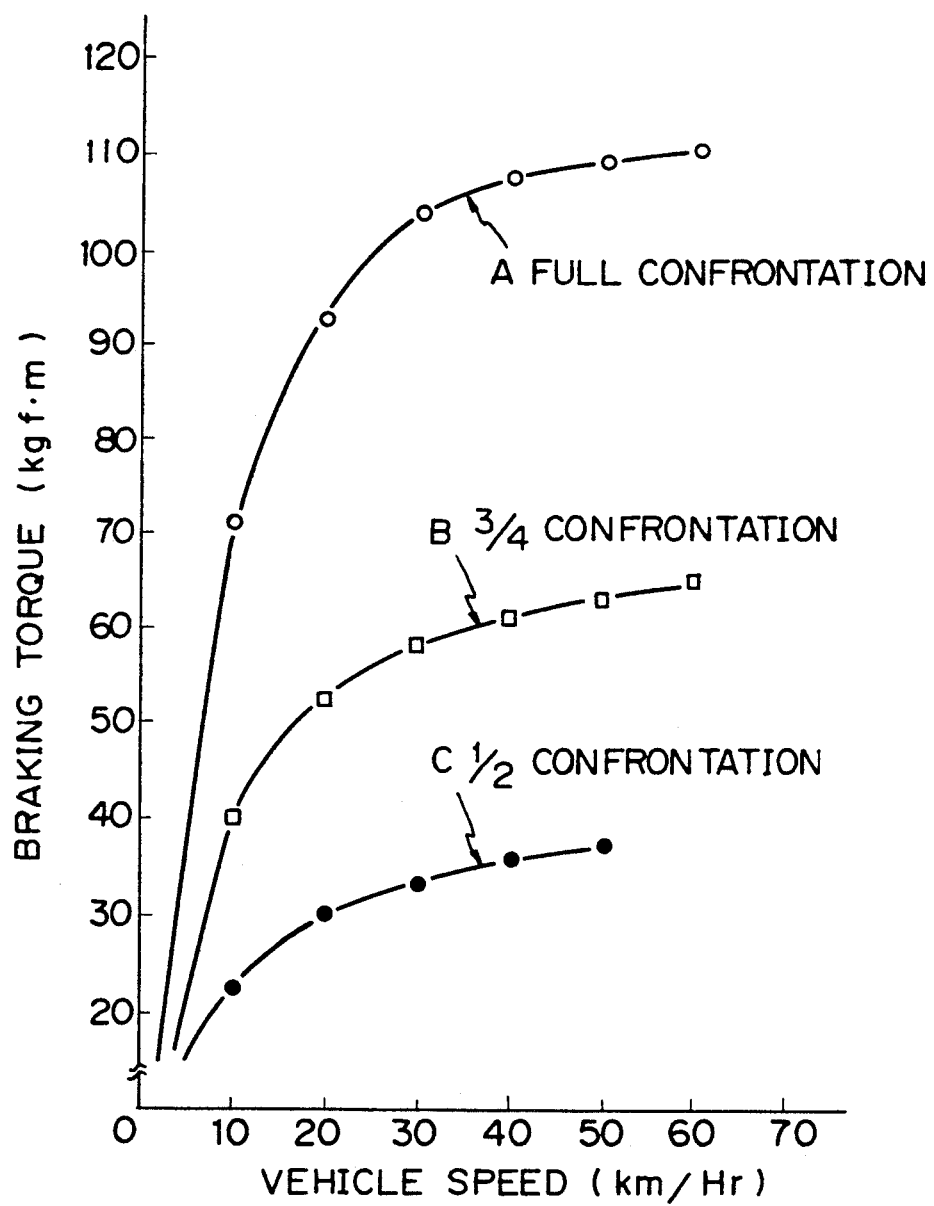
FIG. 5 is a graph showing the relationship between the vehicle speed of an automotive vehicle provided with the eddy current retarder employing rare earth magnets and the braking torque generated by the same retarder.

A torque controlling test was conducted and the results of the test is shown in FIG. 5. The braking torques in the following states were measured at predetermined speeds: (A) full confrontation between the rotor and the rare earth magnets, (B) $\frac{3}{4}$ confrontation between the relevant members and (C) $\frac{1}{2}$ confrontation between the same members.

In this embodiment, the permanent magnets are caused to move back and forth by utilizing the screwing force generated by the screw shaft and the nut, but other mechanisms may be utilized, one of those being described later on.

With the retarder of the present invention described above, since the braking torque to be generated can be adjusted by altering the confronting area between the rotor and the permanent magnets, the braking force can be easily controlled, and a wide range of speed reductions can be dealt with.

To be more specific, according to the present invention, the weight and volume of the retarder can be reduced by 40% compared with those of the prior art retarders, and the power consumption of the former is merely 1/50 to 1/100 of those of the latter.

Referring to FIGS. 6 to 10, a second embodiment of the eddy current retarder according to the present invention will next be described.

Figure 6:
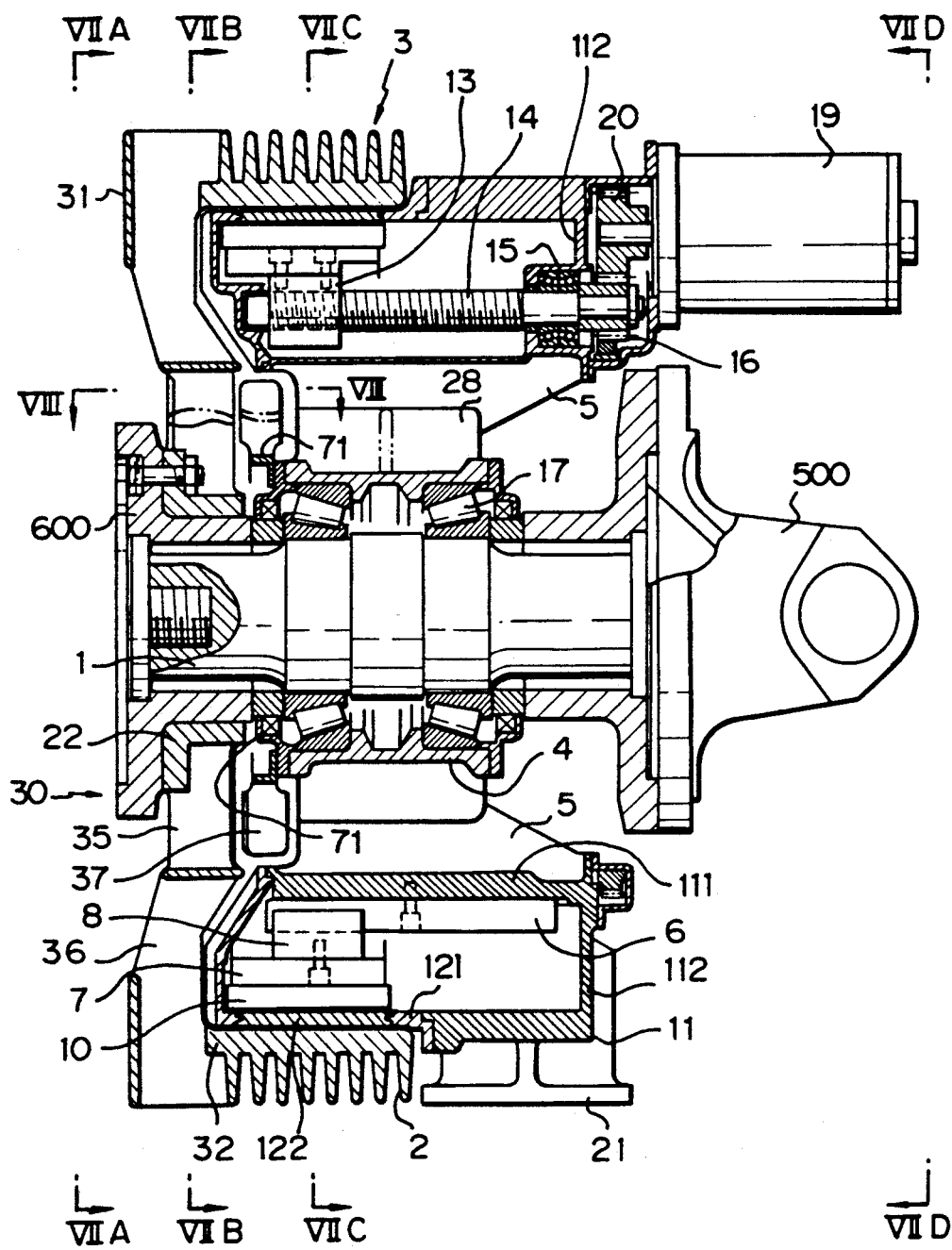
FIG. 6 is a vertical cross-sectional view of the eddy current retarder according to a second embodiment of the present invention which is engaged in a braking operation and is also a vertical cross-sectional view viewed in the direction shown by reference arrows V1 of FIG. 7.
Figure 7:
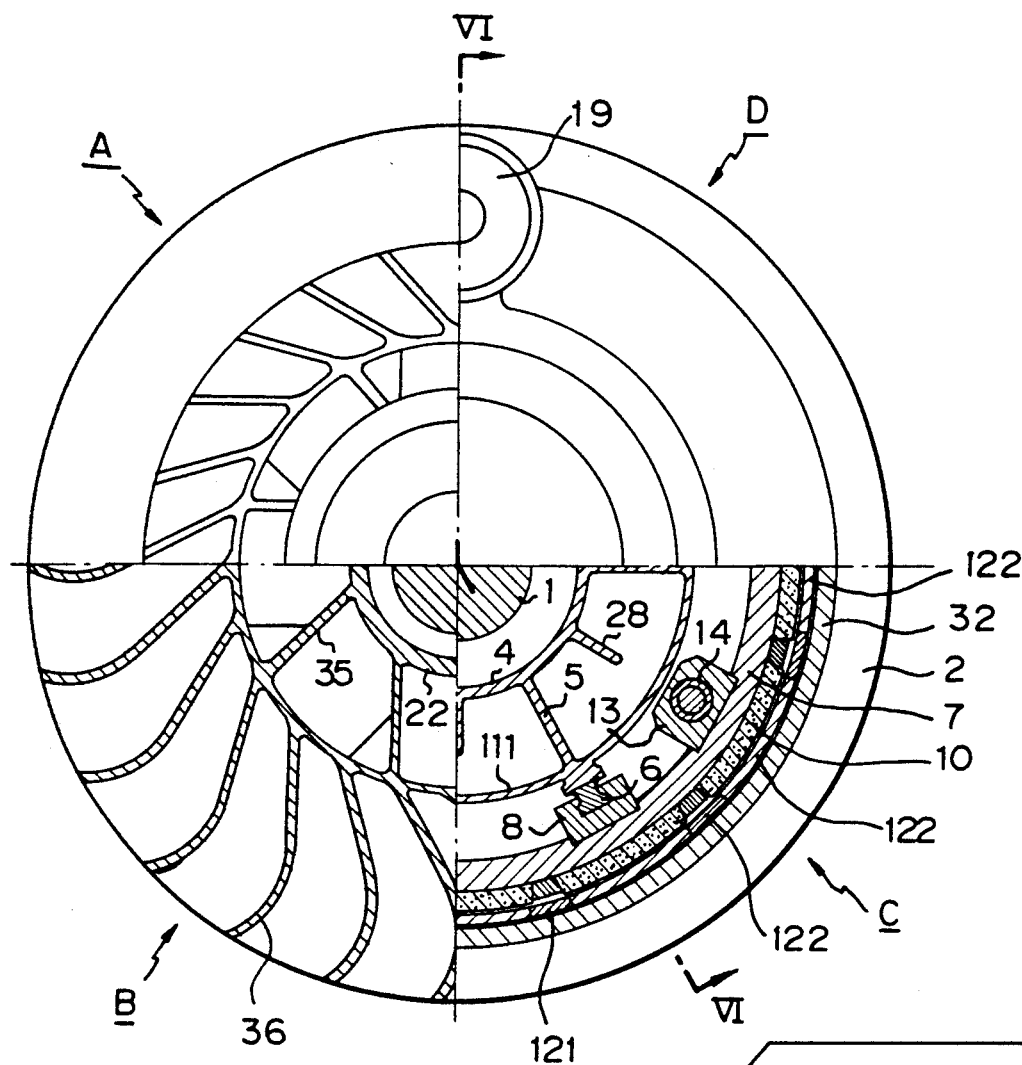
FIG. 7 is a cross-sectional end view of the eddy retarder shown in FIG. 6 comprising four cross-sectional segmentary end views including those viewed in the directions shown by reference arrows VII-A, VII-B, VII-C of FIG. 6, respectively.
Figure 8:
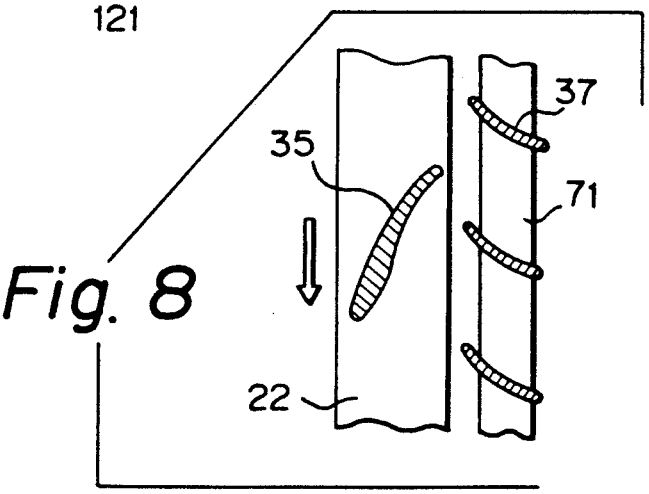
FIG. 8 is a partially cross-sectional view viewed in the direction shown by reference arrow VIII of FIG. 6.

As shown in FIGS. 6 and 7, a boss portion 22 fitted over the rotating shaft 1 at one end thereof and a cylindrical portion 32 having cooling fins provided on the external circumferential surface thereof are connected to each other by means of a support member comprising two blades. This support member has two types of blades: axial blades 35 and radial blades 36 provided, respectively, on the internal circumference side and the external circumference side. An inner tube 111 of the magnetic shield casing is supported on axially elongating support plates 5 radially disposed on the bearing housing tube 4 rotatably supporting the rotating shaft 1. Cooling fins 28 formed on the circumferential surface of the bearing housing tube 4 in such a manner as to protrude therefrom are adapted to be located between the respective adjacent support plates 5. In addition, a group of stator blades 37 radially disposed on a mounting tube 71 mounted on the end face of the bearing housing tube 4 are adapted to be located in the space formed between the axial blades 35 and the cooling fins 28 (refer to FIG. 8). The axially elongating guide rails 6 are provided on the external circumferential surface of the inner tube 111 at, for instance, at such positions such as to equally divide the circumference of the inner tube 111. The sliding saddle 8 is provided on the internal circumferential surface of the support ring 7 having a height equal to the length of the cylindrical portion 32 of the rotor 3 and a cross-sectional area allowing the magnetic fluxes that the permanent magnets hold to easily pass therethrough in such a manner as to ride on the guide rails 6, and this allows the support ring 7 to move over the guide rails 6 back and forth relative to the rotor 3. Permanent magnets 10 each comprising a rare earth magnet are circumferentially provided around the external circumferential surface of the support ring 7 in such a manner that the magnetic poles of any adjacent magnets become opposite to each other.

Figure 9:
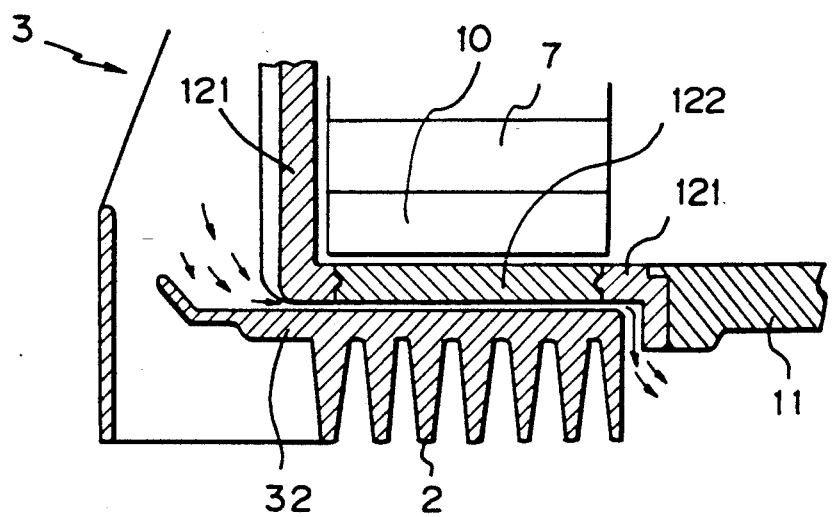
FIG. 9 is a partially enlarged view of the eddy current retarder shown in FIG. 6.

As shown in an enlarged view of FIG. 9, a cylinder 121 formed from a magnetism permeative material is interposed between the internal circumferential surface of the cylindrical portion 32 of the rotor 3 and the permanent magnets 10, and the cylinder 11 having the same diameter as that of the cylinder 121 is provided on the extension of the same. Thus, the cylinders 121 and 11 form together an external tube for the magnetic shield casing, and a lid plate 112 is provided on the ends of the external and internal tubes 11, 111 so as to form the magnetic shield casing. Magnetic shielding is mainly accomplished by the external tube 11. Therefore, this external tube 11 must have such ferromagnetic properties and cross-sectional area as to allow magnetic circuits to be formed therein. The remaining portions of the magnetic shield casing function to protect the permanent magnets against the intrusion of heat, dust and water.

Figure 10:
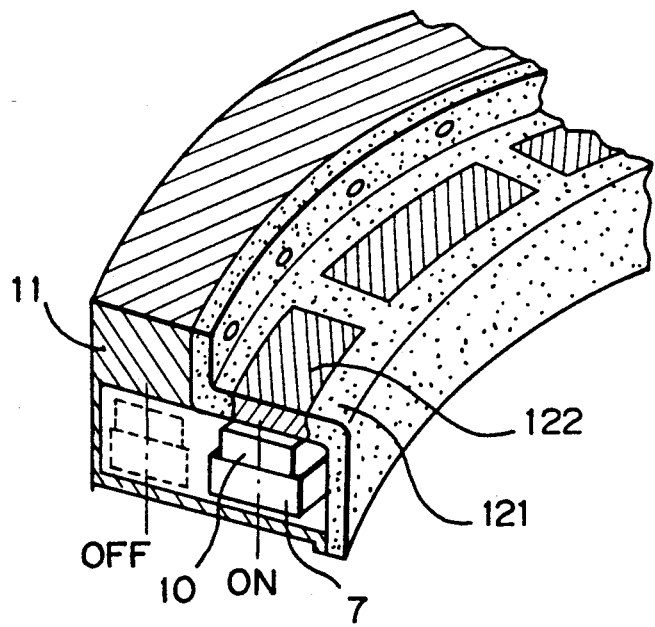
FIG. 10 is a perspective view of the part of a cylindrical component.

As can be seen from the partial perspective view of the cylinder 121 in FIG. 10, the cylinder 121 is provided between the internal circumferential surface of the cylindrical portion 32 of the rotor 3 and the external surface of the permanent magnets 10 and is fixed to the fixed cylinder 11. The cylinder 121 is formed from a non-magnetic material. Ferromagnetic plates 122 are inserted into positions where the non-magnetic cylinder 121 confronts the permanent magnets 10.

In this construction, magnetic circuits are formed for guiding magnetic fluxes from the permanent magnets 10 to the rotor 3 without any loss in the "BRAKE ON" state by forming the portions of the cylinder 121 confronting the permanent magnets 10 from a ferromagnetic material and forming the remaining portion of the same from a non-magnetic material. In addition to this, effective thermal insulation is accomplished, and water, dust, iron powder and so forth are effectively prevented from entering the inside the retarder.

For instance, the cylinder 121 is made of aluminum casting, and the plates 122 made of low-carbon steel are preferably cast together so as to be buried at predetermined positions. This functions to facilitate the assembly of components as well as functioning to deal with the leakage of gas, water and so forth.

As shown in the enlarged view of FIG. 9, a minute opening is designed to be formed between the internal circumferential surface of the cylindrical portion 32 of the rotor 3 and the external surface of the cylinder 121 and the plates 122. This allows a part of the outside air passing through the radial blades 36 to pass through the opening, facilitating the cooling of the internal surface (the highest temperature portion) of the rotor 3. In addition, the direct heat transfer from the permanent magnets 10 to the rotor 3 is prevented by this opening.

The nut 13 is provided on each of the three sliding saddles 8 provided on the internal surface of the support ring 7 at an intermediate position of each saddle in such a manner as to protrude therefrom, and the screwed shaft 14 adapted to be screwed in each nut 13 at one end thereof is rotatably supported at the other end on the bearing 15 mounted on the lid plate 112 of the magnetic shield casing. The main shaft of the motor 19 mounted on the outside of the lid plate 112 is connected to the one end of the screwed shaft 14 in such a manner as to be driven by means of the gear train 20.

When an automotive vehicle is in a driving state, the propeller shaft rotates, and this causes in turn the rotor 3 of the retarder to rotate. Outside air is then equally taken in by means of the axial blades 35 and the radial blades 36. Outside air taken in by the axial blades 35 is caused to flow rearwardly through a space formed between the bearing housing tube 4 and the inner tube 111 of the magnetic shield casing via the stator blades 37, while outside air taken by the radial blades 36 is caused to flow rearwardly along the external circumferential surface of the cylindrical portion 32 of the rotor 3, whereby the group of permanent magnets 10 disposed therebetween are forcibly cooled by the outside air.

With the retarder according to the second embodiment of the present invention in which the axial blades and radial blades are provided on the rotor, the group of permanent magnets 10 are forcibly cooled by outside air taken in by the rotating action of the rotor, and an increase in the magnet temperature is thus controlled. As a result of this, the permanent magnets are maintained in such a condition as to be allowed to exhibit superior magnetic properties, reliable braking operations being thus secured.

Figure 11A:
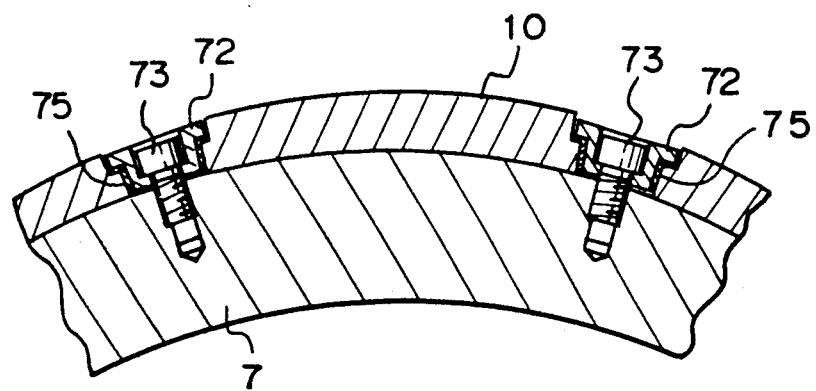
FIG. 11 are diagrams showing an example in which the permanent magnets are supported, wherein FIG. 11 A is a partially vertical cross-sectional view thereof, while FIG. 11 B is an exploded perspective view of the supporting means shown in FIG. 11 A.
Figure 11B:
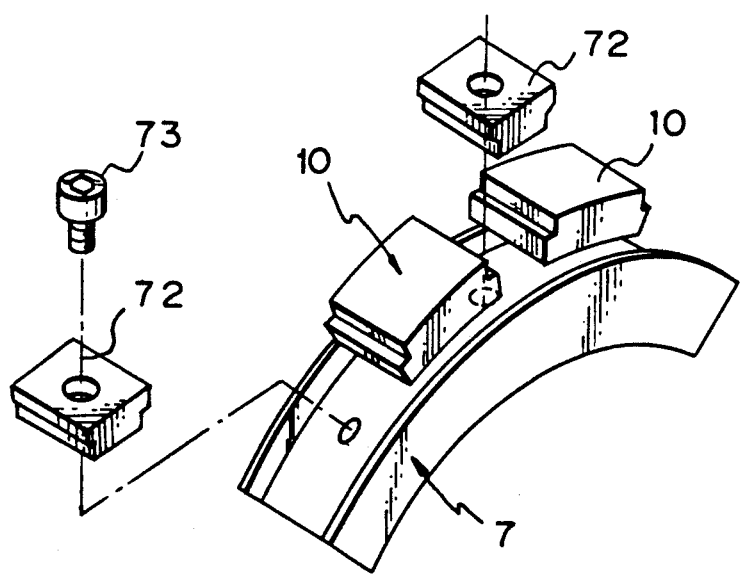

Referring to FIGS. 11A and 11B, a third embodiment of the eddy current retarder according to the present invention will be described.

In this third embodiment, in order to mount the permanent magnets 10 on the support ring 7 in an easy and accurate way, the permanent magnets 10 are integrally fastened to the support ring 7 formed from a ferromagnetic material by means of fastening components 73 formed from a non-magnetic material via metal presser members 72 formed from a non-magnetic material. A heat-resistant resilient material 75 is inserted in each position where the metal presser member 72 is brought into contact with the permanent magnet 10 so as to absorb the difference in the thermal expansion between the permanent magnets 10 and the support ring 7, whereby the surface coating of the respective permanent magnets 10 is protected.

Figure 12:
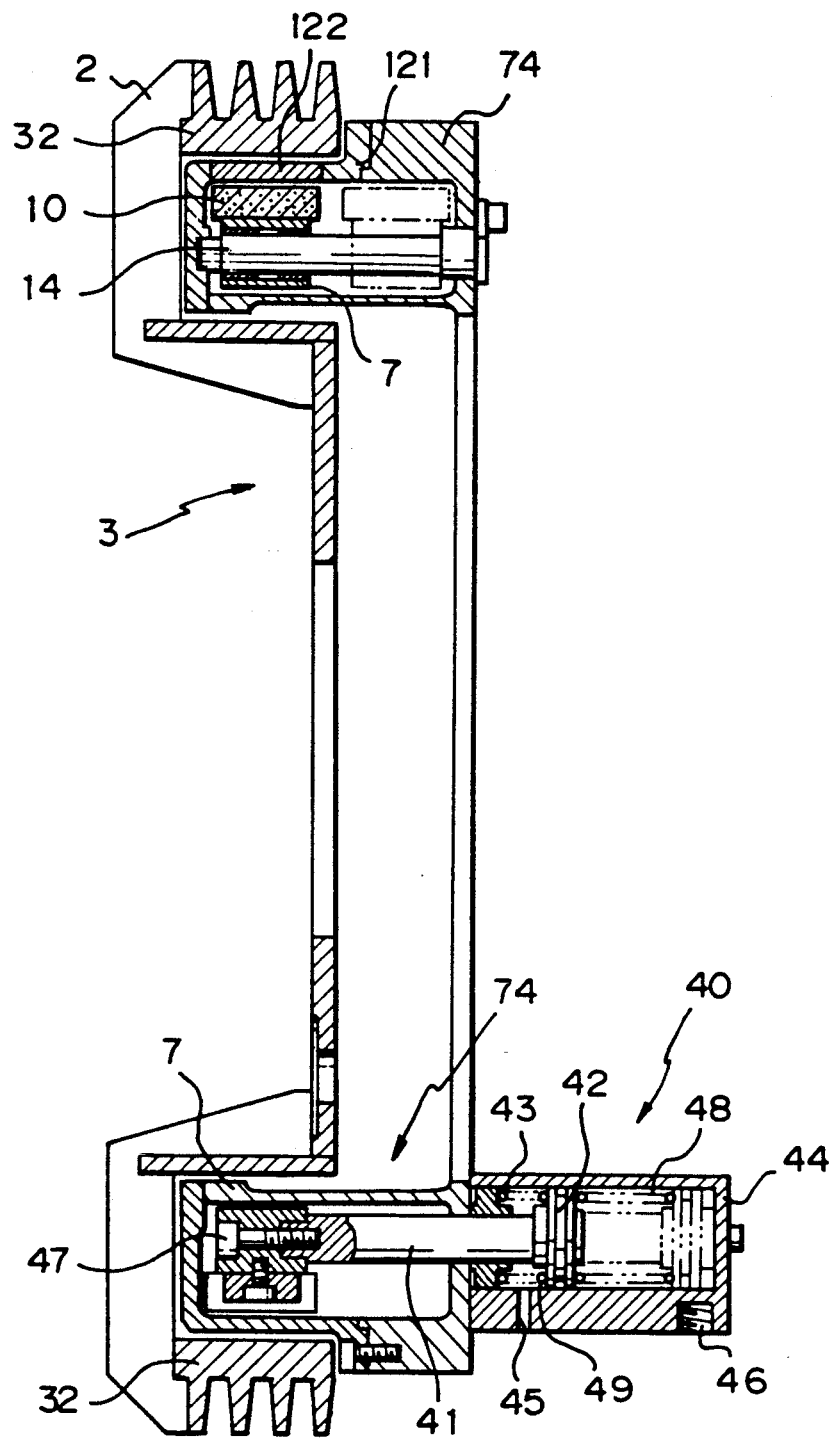

Referring to FIG. 12, a fourth embodiment of the eddy current retarder according to the present invention will be described.

In this fourth embodiment, a safety device is provided for automatically releasing the brake when an abnormality occurs therein. In addition, air cylinders 40 are used as a feeding mechanism for the support ring 7 instead of the screwed shafts 14 and nuts 13, and these air cylinders 40 are disposed on the back of a magnetic shield casing 74 at such positions as to equally divide the circumference thereof into three. As shown in FIG. 12, each air cylinder 40 has an extruding port 46 in a right-hand side chamber 48 and an air bleeding port 45 in a left-hand side chamber 49. A coil spring 43 having a spring force sufficient to press back an associated piston 42 to its rearward position is provided in the left-hand side chamber 49, and the distal end of a piston rod 41 is attached to the magnet support ring 7 by means of a bolt 47.

A guide shaft rod 14 is provided in parallel to the piston rod 41 in such a manner as to slidably penetrate the support ring 7 and is supported on the end faces of the magnetic shield casing 74. As shown in FIG. 12, this guide shaft rod 14 has a length allowing the permanent magnets 10 to withdraw from a first position shown by solid lines where the magnets 10 fully confront the cylindrical portion 32 of the rotor 3 to a second position shown by chain lines where the magnets 10 fully deviate from the cylindrical portion 32 of the rotor 3, and the piston rod 41 has the same length as that of the guide shaft rod 14.

In the retarder according to the fourth embodiment, as is clear from FIG. 12, the support ring 7 around which the permanent magnets 10 are circumferentially disposed is caused to fully deviate from the cylindrical portion 32 of the rotor 3 to be located at the position shown by chain lines in the state in which compressed air in the right-hand side chamber 48 of the air cylinder 40 is bleeded therefrom with the piston 42 being pressed rearward by the coil spring 43 to be located at at the position shown by chain lines. In this state, since an eddy current does not flow inside the rotor 3, the retarder remains in the "BRAKE OFF" state.

In this "BRAKE OFF" state, when compressed air is supplied from the extruding port 46, the piston is pressed to move while overcoming the spring force of the coil spring 43 until the permanent magnets 10 fully confront the cylindrical portion 32 of the rotor 3, whereupon an eddy current is allow to flow to the rotor 3. A maximum braking torque is then obtained, and the vehicle speed of an automotive vehicle is greatly reduced.

In this state in which a maximum braking torque is obtained, in contrast, when the right-hand side chamber 48 of the air cylinder 40 is depressurized by gradually bleeding compressed air therein, the piston 42 is caused to accordingly withdraw by the action of the spring force of the coil spring 43.

Therefore, in a case where a low braking force is needed, the position of the permanent magnets 10 may be adjusted in such a manner as that the confronting area between the permanent magnets 10 and the rotor 3 becomes intermediate between the full confrontation position and that of full deviation.

In the "BRAKE ON" state shown by solid lines in FIG. 12, in a case where the braking condition must be urgently released due to the occurrence of a problem in an automotive vehicle during the braking operation, the right-hand side chamber 48 of the air cylinder 40 may be depressurized by opening a valve (not shown) provided at a position along the length of an air pipe communicating with the extruding port 46 is opened so as to discharge compressed air from the right-hand side chamber 48. This allows the piston 42 to be pressed to withdraw by the action of the spring force of the coil spring 43, and the piston 42 is restored to its "BRAKE OFF" state.

With this embodiment, in a case where the braking condition must be released due to the occurrence of a problem in an automotive vehicle, the retarder can be restored to the "BRAKE OFF" state quickly and securely only by simply discharging compressed air in the air cylinder for performing ON-OFF operations.

Referring to FIGS. 13 to 16, a fifth embodiment of the eddy current retarder according to the present invention will be described.

In this embodiment, eddy current paths 53 are formed on the internal circumferential surface of the rotor at positions thereof confronting the permanent magnets 10 so as to obtain high braking efficiency.

Figure 13:
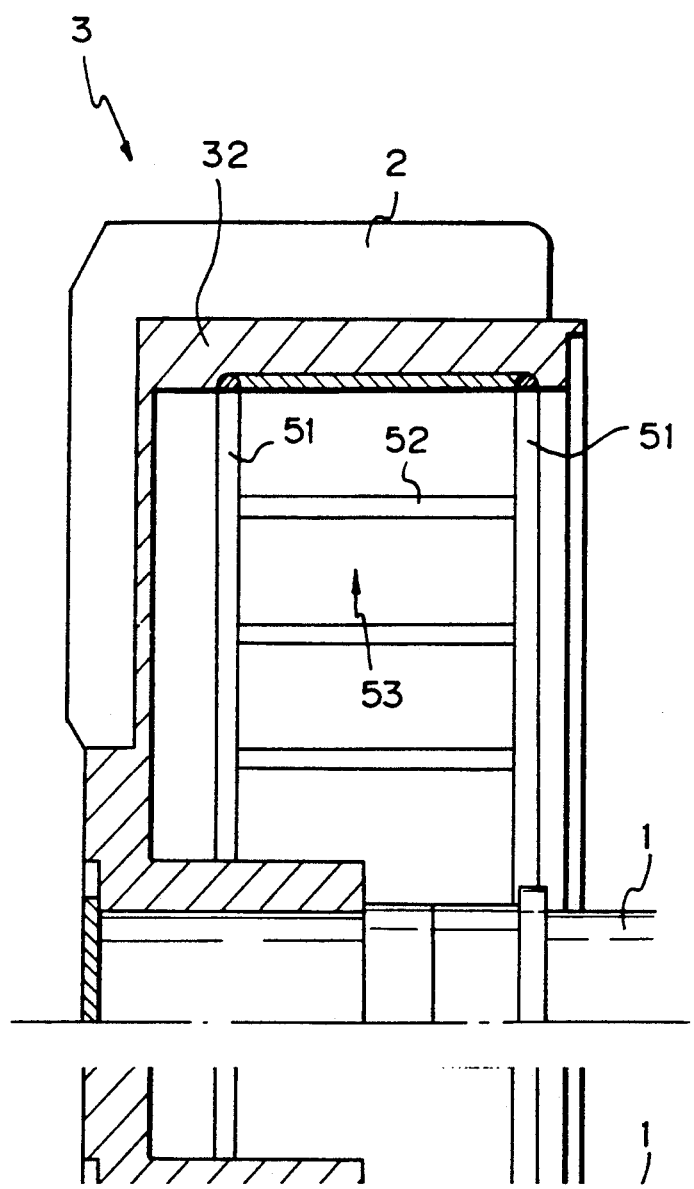
FIG. 13 is a partial vertical view of the internal circumferential surface of the cylindrical portion of the rotor of the first embodiment showing a modified internal circumferential surface thereof.
Figure 14:
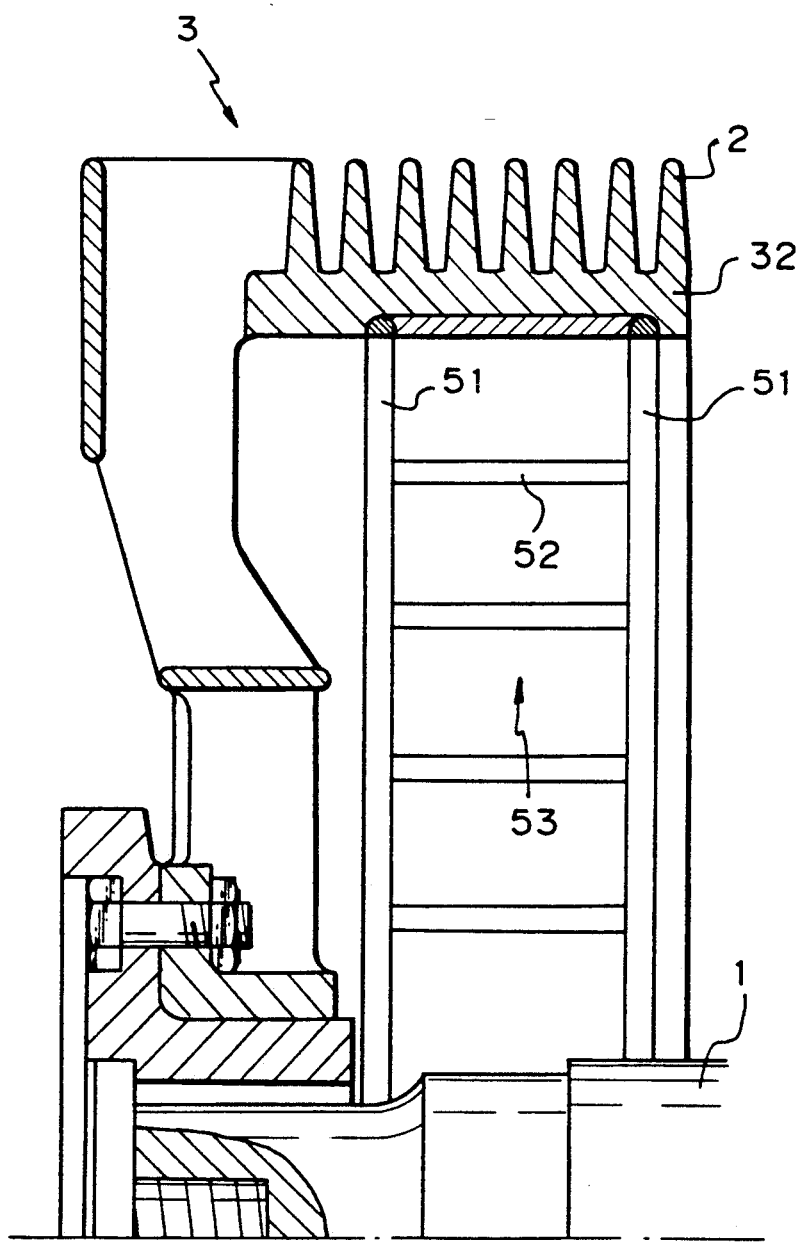
FIG. 14 is a partial vertical view of the internal circumferential surface of the cylindrical portion of the rotor of the second embodiment showing a modified internal circumferential surface thereof.

As shown in FIGS. 13 and 14, the eddy current paths 53 are formed on the internal circumferential surface of the cylindrical portion 32 of the rotor 3. Electrically conductive rings 51 formed from a material having an electrical resistance smaller than that of iron such as copper, aluminum and so forth are mounted on the ends of the internal circumferential surface of the cylindrical portion 32, and a plurality of electrically conductive slots 52 formed from the same material as that of the electrically conductive rings 51 are circumferentially disposed in such a manner as to extend in parallel to the rotating shaft 1 between the left- and right-hand electrically conductive rings 51 with the ends of the respective slots 52 being connected to the left- and right-hand rings 51. Thus, the eddy current paths 53 are constituted by the slots 52 and the rings 51.

To be more specific, in forming the eddy current paths 53, the electrically conductive rings 51 are fitted in grooves formed in the ends of the internal circumferential surface of the cylindrical portion 32, and the electrically conductive slots 52 are also fitted in grooves axially formed between the circumferential grooves and circumferentially disposed on the internal circumferential surface of the cylindrical portion 32. The connecting portions between the respective slots 52 and rings 51 are joined together by utilizing, for instance, copper welding or silver brazing. Other welding methods may be employed as a manufacturing method.

Figures 15A, 15B:
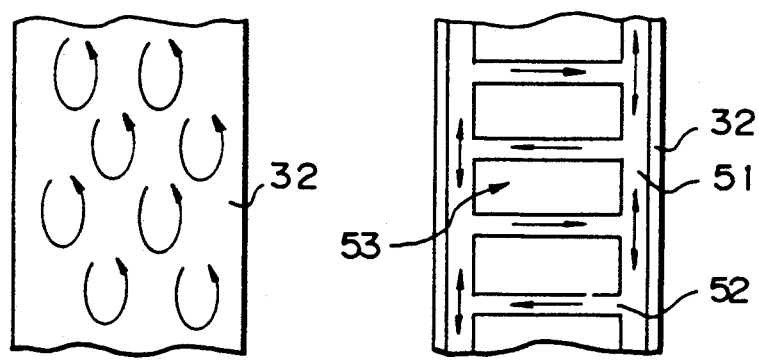
FIG. 15 are explanatory views showing the flows of eddy current generated on the internal circumferential surface of the cylindrical portion of the rotor, wherein FIG. 15 A shows the flow of eddy current experienced with the prior art retarder, while FIG. 15 B shows the flow of eddy current realized according to the present invention.
Figure 16:
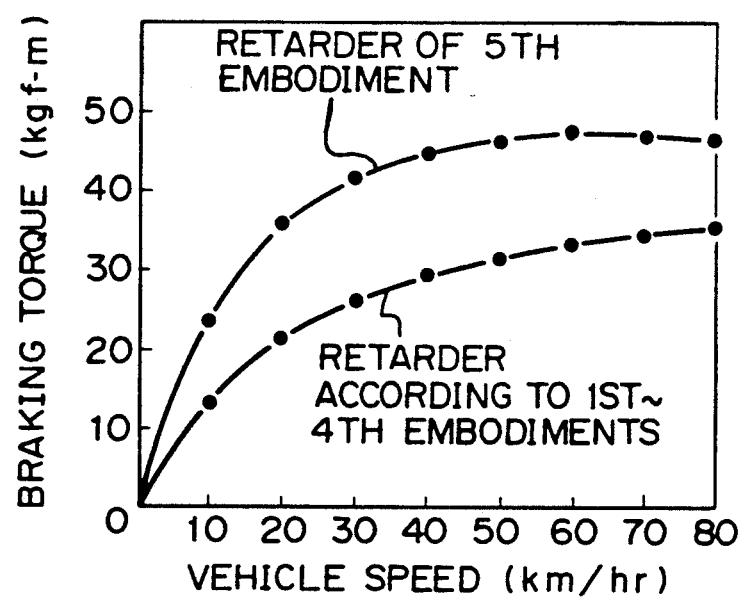
FIG. 16 is a graph showing the relationship between the vehicle speed of a truck of a large tonnage provided with the prior art retarder and the braking torque generated by the same retarder as well as the relationship between the vehicle speed of a truck of a large tonnage provided with the retarder according to the present invention and the braking torque generated by the same retarder.

Therefore, as shown in FIG. 1, when the pole surfaces of the permanent magnets 10 fully confront the internal circumferential surface of the cylindrical portion 32, i.e. the "BRAKE ON" state, an eddy current is generated in the cylindrical portion 32 of the rotor 3 via magnetic circuits including the magnet support ring 7 and the cylindrical portion 32 of the rotor 3 and formed between any adjacent permanent magnets. This generated eddy current is, as shown in FIG. 15B, allowed to flow in the eddy current paths 53 comprising the electrically conductive rings 51 and slots 52 in the direction shown by reference arrows in the same drawing. Thus, it is possible to increase the amount of eddy current flowing axially by increasing the number of the electrically conductive slots 52.

When the permanent magnets 10 is caused to withdraw from the above "BRAKE ON" position, the magnetic circuits are then formed between the adjacent permanent magnets 10 including the fixed member, and an eddy current is not generated in the cylindrical portion 32 of the rotor 3. Thus, the retarder is restored to its "BRAKE OFF" state.

In this embodiment, the electrically conductive rings 51 each having a circular cross section and the electrically conductive slots 52 each having a rectangular cross section are fitted in the grooves formed in the internal circumferential surface of the cylindrical portion 32, but other constitutions may be employed.

In addition, although two electrically conductive rings are used in this embodiment, one electrically conductive ring (either of the two) may be employed. In this case, although there is a difference in the efficiency, the same effect can be obtained.

Speed-holding tests were conducted utilizing trucks of a large tonnage on which the eddy current retarder of this fifth embodiment in which the eddy current paths 53 are formed and the eddy current retarders according to the previously described embodiments of the present invention are provided at a position along the length of the respective propeller shafts thereof. The results of the speed holding tests were shown in FIG. 16. The results show that higher braking torgues were obtained at the respective tested speeds with the retarder of the fifth embodiment compared with those of the other embodiments. This is because, as shown in FIG. 15A, an eddy current is generated on the whole area of the internal circumferential surface of the cylindrical portion 32 with little axial eddy current useful for the generation of braking torque being present with the retarders according to the previously described embodiments, while with the retarder of the fifth embodiment, as shown in FIG. 15B, since the electrical resistance is small, an eddy current flows smoothly, and hence a relatively large amount of current can be generated with much axial eddy current useful for the generation of braking torque being present.

With the eddy current retarder according to this embodiment, the eddy current paths useful for generating the axial eddy current are formed in the internal circumferential surface of the cylindrical portion of the rotor that is adapted to confront the permanent magnets, whereby the braking force can be increased by increasing the amount of the axial eddy current useful for the generation of braking torque.

What is claimed is:

1. An eddy current reduction gear comprising:
    a rotor (3) fixed to one end of a rotating shaft (1);
    a support ring (7) coaxial with said rotor (3) and axially slidably mounted on a fixed main body (5, 6, 11, 21) with a predetermined gap being secured between said rotor (3) and said support ring;
    a plurality of permanent magnets (10) mounted on an external circumferential surface of said support ring (7) in such a manner that magnetic poles of the magnets are aligned with a direction parallel to the axis of said support ring (7) and the polarities of any adjacent permanent magnets of said plurality of permanent magnets (10) become opposite to each other; and
    a shifting mechanism (13, 14, 16, 18, 19, 20) for axially shifting said support ring (7) between a first position where pole surfaces of all of said permanent magnets (10) confront an internal circumferential surface of said rotor (3) and a second position where said pole surfaces of all of said permanent magnets (10) substantially deviate from said internal circumferential surface of said rotor (3);
    a fan (30) having axial blades (35) and radial blades (36) formed, respectively, radially inwardly and radially outwardly of a support member (31) connecting a boss portion (22) of said rotor (3) and a cylindrical portion (32) of said rotor;
    stator blades (37) formed close to said axial blades (35) on a bearing member (4) supporting said rotating shaft (1) in such a manner as to extend along the circumference thereof; and
    cooling fins (28) radially disposed on an external circumferential surface of said bearing member (4).

2. An eddy current reduction gear according to claim 1, wherein a cylinder (121) is provided between the internal circumferential surface of said rotor (3) and external surfaces of said permanent magnets (10), wherein said cylinder (121) is fixed to said fixed main body (11), said cylinder (121) is formed from a nonmagnetic material, and wherein plates (122) formed from a ferromagnetic material are placed in said cylinder (121) at positions confronting said permanent magnets (10).

3. An eddy current reduction gear according to claim 1, wherein said permanent magnets (10) comprise rare earth magnets having a strong magnetic force.

4. An eddy current reduction gear according to claim 3, wherein a cylinder (121) is provided between the internal circumferential surface of said rotor (3) and external surfaces of said permanent magnets (10), wherein said cylinder (121) is fixed to said fixed main body (11), said cylinder (121) is formed from a nonmagnetic material, and wherein plates (122) formed from a ferromagnetic material are placed in said cylinder (121) at positions confronting said permanent magnets (10).

* * * * *